(12) United States Patent
Parsapour et al.

(10) Patent No.: US 8,765,338 B2
(45) Date of Patent: Jul. 1, 2014

(54) QUANTUM DOT PHOTOCONDUCTOR FOR AN ELECTROPHOTOGRAPHIC PRINTER

(75) Inventors: Farzad Parsapour, Bartlett, TN (US); Juzo Kuriyama, Germantown, TN (US); Rodney Loyd, Cordova, TN (US)

(73) Assignee: Brother International Corporation, Bridgewater, NJ (US)

( * ) Notice: Subject to any disclaimer, the term of this patent is extended or adjusted under 35 U.S.C. 154(b) by 0 days.

(21) Appl. No.: 13/565,297

(22) Filed: Aug. 2, 2012

(65) Prior Publication Data

US 2014/0038093 A1 Feb. 6, 2014

(51) Int. Cl.
*G03G 15/02* (2006.01)

(52) U.S. Cl.
USPC ............ 430/59.1; 430/56; 430/58.05; 430/69

(58) Field of Classification Search
USPC .............................. 430/56, 58.05, 59.1, 60, 69
See application file for complete search history.

(56) References Cited

U.S. PATENT DOCUMENTS

2006/0127794 A1* 6/2006 Tokarski et al. ............... 430/117
2011/0031399 A1* 2/2011 So ................................. 250/330

* cited by examiner

*Primary Examiner* — Stewart Fraser
(74) *Attorney, Agent, or Firm* — Frommer Lawrence & Haug LLP

(57) ABSTRACT

A photoconductor and method of forming a photoconductor comprising forming a charge generation material comprising a plurality of quantum dots, and forming an active region comprising one or more photoconductor layers comprising the charge generation material including the quantum dots is disclosed.

42 Claims, 2 Drawing Sheets

◇ : QD (CGM)

▲ : Hole Transport Material (HTM)

● : Electron Transport Material (ETM)

▓ : Polymer Matrix

QUANTUM DOT PHOTOCONDUCTOR FOR AN ELECTROPHOTOGRAPHIC PRINTER

BACKGROUND OF THE INVENTION

Electrophotographic printing is a non-impact printing technology invented by Chester Carlson in the 1930s. It occupies a large segment of the total printing market, with a global market value of $59.9 billion in 2009. Electrophotographic printing is a highly complex printing technology consisting of 2 core components, namely the photoconductor (PC) and the toner. The printing process involves 7 distinct steps, which include PC charging, PC exposure, toner development, toner transfer, fusing, cleaning, and charge erasure. The photoconductor, as a primary component, is involved in 6 of the 7 aforementioned steps. Thus, both photoconductor durability and performance are required and highly sought-after characteristics.

The photoconductor is the component through which a latent image can be formed, with the latent image being developed by toner particles in the subsequent step. Initially, an electrostatic charge is distributed through projection on the surface of the PC. Next, light exposure results in generation of charge carriers within the PC and through absorption of light by the Charge Generation Material (CGM). The charge carriers are transported to the PC surface and the opposite electrode by Charge Transport Material (CTM). As the charge carriers reach the surface, they neutralize surface charges within the area previously illuminated. This forms a latent image on the surface of the PC, which can then be subjected to toner development.

Photoconductor performance relies on several factors, including charge acceptance during projection of charge on PC surface, free charge generation and transport following illumination, and the degree of surface charge neutralization. All these factors work in concert to exemplify the overall performance of a photoconductor.

The performance is typically measured in terms of sensitivity of the photoconductor to light exposure at a particular wavelength, with higher photosensitivities associated with enhanced PC performance.

The charge generation material (CGM) incorporated in a photoconductor serves the above-mentioned photoconductor performance. Desired CGM characteristics include efficient absorption of light at the exposure wavelength, low recombination of initially-generated charges, the ability to produce free charges and transfer charges to transport material, and photostability. As such, photoconductor performance relies on both the optical/electronic properties of the CGM and manipulation of these properties through the choice of correct material and environment. In addition, it is desirable to manufacture PC in a cost-effective manner, so as to reduce the overall cost of the printing device.

SUMMARY OF THE INVENTION

Semiconductor quantum dots (QD) have unique physical, chemical, electrical and optical properties. Optical and electrical characteristics of QDs stem from size-dependent properties owing to quantum confinement of charge carriers. This often results in the ability to "tune" the optical spectrum and specifically, both the light absorption and emission responses through changing the size of the QD.

Disclosed is a quantum dot photoconductor and a method for fabricating a photoconductor (PC) for an electrophotographic printing device. The photoconductor, designated hereafter as the quantum dot photoconductor (QDPC), utilizes semiconductor quantum dots (QD) as the charge generation material (CGM) within the photoconductor, resulting in enhanced performance. Exemplary advantages of the photoconductor utilizing QD may include an overall increase in printing speed and longer lifetime when integrated with an electrophotographic printing device; these benefits arising directly as a result of enhancements in the properties of the photoconductor. The advantages in photoconductor characteristics arise due to a number of factors, including spectral tunability of the quantum dot CGM, increase in absorption coefficient, the ability to manipulate the position of electronic levels and energetics, modification of quantum dot surface, and an intrinsic increase in photostability in inorganic materials compared to organic moieties.

Embodiments of the photoconductor can include one or more layers. In disclosed embodiments, the photoconductor comprises a positively-charged surface and a "Single-Layer" architecture, which incorporates all PC components in a single active layer, and may include conventional charge transport materials (CTM) for both electron and hole transport within a polymer matrix host.

In disclosed embodiments, the photoconductor may utilize a negatively-charged surface and a "Dual-Layer" architecture, which incorporates a charge generation layer (CGL) and a charge transport layer (CTL) as two discreet and separate layers, the combination of which forms the active region.

Incorporation of the semiconductor quantum dots as CGM in place of conventional organic-based dyes or pigments in the photoconductor results in the aforementioned enhancements. The aforesaid methods of fabrication and implementation are applicable to a wide range of quantum dots, including size-dependent or composition-dependent QDs of varying sizes and compositions, core, core-shell, alloyed core, alloyed core-shell quantum dots and doped quantum dots.

Semiconductor quantum dots (QD) have unique physical, chemical, electrical and optical properties. Optical and electrical characteristics of QDs stem from size-dependent properties owing to quantum confinement of charge carriers. This often results in the ability to "tune" the optical spectrum and specifically, both the light absorption and emission responses through changing the size of the QD.

Disclosed are embodiments of a photoconductor comprising: at least one conductive layer and; an active region comprising at least one photoconductor layer comprising a charge generation material (CGM) comprising a plurality of quantum dots. The device can further comprise the quantum dots, examples of which include quantum dots selected from: size-dependent quantum dots, composition-dependent quantum dots, core-shell quantum dots, alloyed core quantum dots, alloyed core-shell quantum dots, InP/ZnS core-shell quantum dots, CdS, CdSe, ZnS, ZnSe, GaN, GaP, InP, InN, PbSe, PbS, Ge, CuI, Copper Indium Disulfide (CIS), Si, CdSSe, and ZnS:Mn doped quantum dots.

The conductive layer can comprise a conductive substrate, examples of which include aluminum plates and cylinders. The conductive layer can comprise, a non-conductive substrate coated with a conductive material, examples of which include aluminum-coated Mylar or PET, and nickel-coated Mylar or PET.

In embodiments, the photoconductor device further comprises: an active region comprising a single layer. The photoconductor device can comprise the single layer thickness in the range of from about 1 micrometer to about 40 micrometers. For example, in an embodiment the single layer thickness can be in the range of from about 20 to about 37 micrometers.

In embodiments, the photoconductor device further comprises an active region comprising at least two layers. The photoconductor can comprise: a CGL comprising the QDs, and a CTL comprising the CTM. The CGL can formed from a solution comprising a solid weight ratio of the quantum dots being from about 1 percent to about 10 percent. In an embodiment, the photoconductor can comprise the CGL being in the range of about 10 nm to about 2000 nm and the CTL being in the range of about 1 micrometer to about 40 micrometers. For example the CTL can be from about 5 micrometers to about 35 micrometers.

In embodiments, the CGL can consist essentially of quantum dots. For example the photoconductor CGL consists essentially of quantum dots. The CGL can be formed from a CGM solution comprising from about 1% to about 20% QD. In an embodiment the CGL can further comprise a layer thickness in the range of from about 1 micrometer to about 3 micrometers.

In embodiments, the GCL can comprise a polymeric material comprising a polymer matrix or resin or both, wherein photoconductor is formed with at least one solution of the polymeric material including at least one of the CGM or a CTM. The polymeric material selected from the materials including: Bisphenol-A-polycarbonate, Poly(methyl methacrylate), Polystyrene, Polyvinyl butyral, Polyester, and Polycarbonate-Z. In an embodiment, the photoconductor can comprise: a solid weight ratio of the quantum dots to the polymer being from about 2 percent to about 40 percent.

In embodiments, the photoconductor further comprises: a Hole Transport Material (HTM), wherein the photoconductor is formed by dissolving the HTM in a solution of a polymeric material in solvent to make an HTM solution. The HIM comprising an HTM selected from materials including: N,N'-Bis(3-methylphenyl)-N,N'-diphenylbenzidine, N,N'-Di-[(1-naphthyl)-N,N'-diphenyl]-1,1'-biphenyl)-4,4'-diamine, Tetra-N-phenylbenzidine, Tris[4-(diethylamino)phenyl] amine, N,N-diethylaminophenylbenzaldehyde-diphenylhydrazone, and substituted Hydrazones. In the embodiment, the solid weight ratio of the quantum dots to the CTM in the range of from about 1:10 to about 5:10. In the embodiment, CTM of the photoconductor can include HTM, but no ETM. In an embodiment, the active region can comprise at least two layers, and the CGM solution can comprise the solid weight ratio of the quantum dots to the polymer in the range of from about 0.01:10 to about 5:10 wherein the CGL is formed from the CGM solution.

In embodiments, the photoconductor can further comprise: an Electron Transport Material (ETM), wherein the photoconductor is formed by dissolving the ETM in a solution of a polymeric material in solvent to make an ETM solution. The ETM can comprise an ETM including: Bathocuproine, Bathophenanthroline, 2,5-Bis(1-naphthyl)-1,3,4-oxadiazole, 3,5-Bis(4-tert-butylphenyl)-4-phenyl-4H-1,2,4-triazole, and Tris-(8-hydroxyquinoline)aluminum.

In an embodiment the ETM solution can comprise a solid weight ratio of ETM to polymer in the range of from about 0.1:10 to about 1:1. For example the ETM solution comprising the solid weight ratio of ETM to polymer being from about 0.5:10 to about 2:10. In the embodiment, CTM of the photoconductor can include ETM, but no HTM.

In an embodiment, the photoconductor comprises the photoconductor being formed by combining an HTM solution and the ETM solution to form a CTM preparation, and adding the solution comprising quantum dots to the CTM preparation. The HTM solution can comprise a solid weight ratio of HTM to polymer in the range of from about 0.5:10 to about 1:1. For example the solid weight ratio of HTM to polymer can be in the range of from about 9:10 to about 1:1; and the ETM solution can comprise solid weight ratio of ETM to polymer being from about 0.1:10 to about 1:1. The ETM solution can comprise the solid weight ratio of ETM to polymer being from about 0.5:10 to about 2:10. The CTM can comprise a weight ratio of ETM:HTM:Polymer in the range of 5:45:50 to about 10:40:50.

In embodiments, the photoconductor can comprise an undercoat layer (UCL), the UCL being pre-coated on the conductive layer prior to deposition of the at least one photoconductor layer, wherein the UCL comprises a material for eliminating charge injection from a conductive substrate forming the conductive layer. The UCL can comprise a UCL selected from the group of anodized aluminum, titanium dioxide, and 2-aminopropyltriethoxysilane. The UCL can comprise a thickness in the range of from about 50 nanometers to about 500 nanometers.

Disclosed are embodiments of a method of forming a photoconductor comprising: forming a CGM comprising a plurality of quantum dots, and forming an active region comprising at least one photoconductor layer comprising the CGM on a substrate including at least one electrically conductive layer.

The method can comprise forming the CGM with quantum dots examples of which include: size-dependent quantum dots, composition-dependent quantum dots, core-shell quantum dots, alloyed core quantum dots, alloyed core-shell quantum dots, doped quantum dots, InP/ZnS core-shell quantum dots, CdS, CdSe, ZnS, ZnSe, GaN, GaP, InP, InN, PbSe, PbS, Ge, CuI, Copper Indium Disulfide (CIS), Si, CdSSe, and ZnS:Mn doped quantum dots. The method can comprise providing the conductive layer, the conductive layer comprising a conductive substrate selected from the group of aluminum plates and cylinders, a non-conductive substrate with a conductive material, aluminum-coated Mylar or PET, and nickel-coated Mylar or PET.

In embodiments the method can comprise: forming a CTM. The method can further comprise coating the conductive layer with a solution comprising the CTM and the CGM to form an active region comprising a single layer.

In embodiments the method can comprise depositing the photoconductor layer at a thickness in the range of from about 1 micrometer to about 40 micrometers. For example the method can comprise depositing the photoconductor layer at a thickness in the range of from about 20 to about 37 micrometers.

In embodiments the method can comprise forming an active region comprising at least two layers. The method can comprise forming a CGL comprising the QDs, and forming a CTL comprising the CTM. The CGL can be in the range of about 10 nm to about 2000 nm, and the CTL can be in the range of about 1 micrometer to about 40 micrometers. For example, the CTL can be from about 5 micrometers to about 35 micrometers. In an embodiment, the method can comprise forming the CGL from a CGM solution comprising a solid weight ratio of the quantum dots being from about 1 percent to about 10 percent.

In embodiments, the method can further comprise: forming the CGL from a CGM solution consisting essentially of quantum dots. The CGL can formed from a solution comprising a solid weight ratio of the quantum dots being from about 1 percent to about 10 percent. In an embodiment, the photoconductor can comprise the CGL being in the range of about 10 nm to about 2000 nm and the CTL being in the range of about 1 micrometer to about 40 micrometers. For example the CTL can be from about 5 micrometers to about 35 micrometers.

In embodiments, the method can further comprise: forming the photoconductor with at least one solution of polymeric material comprising a polymer matrix or resin or both, the polymeric material including at least one of the CGM or the CTM.

In embodiments the method can comprise forming the CTM by dissolving a Hole Transport Material (HTM) in a solution of the polymeric material to make an HTM solution. The dissolving in the solvent can comprise a solvent examples of which include: 2-butanone, cyclohexanone, 1,4-dioxane, chloroform, tetrahydrofuran (THF), benzene, and methylene chloride.

In an embodiment the method further comprises dissolving such that the HTM solution comprises a solid weight ratio of HTM to polymer in the range of from about 0.5:10 to about 1:1.

In embodiments the method comprises forming an active region comprising the at least two layers, and forming a CGM solution comprising a solid weight ratio of the quantum dots to the polymer in the range of from about 0.01:10 to about 5:10, wherein a charge generation layer (CGL) is formed from the CGM solution. In an embodiment, the CTM of the photoconductor can include HTM, but no ETM.

In embodiments the method can comprise forming the CTM by dissolving an ETM in a solution of the polymeric material to make an ETM solution, and forming the active region comprising a single layer.

In an embodiment the ETM solution can comprise a solid weight ratio of ETM to polymer in the range of from about 0.1:10 to about 1:1. For example the ETM solution comprising the solid weight ratio of ETM to polymer being from about 0.5:10 to about 2:10. In the embodiment, CTM of the photoconductor can include ETM, but no HTM.

In embodiments, the method can further comprise forming the photoconductor by dissolving an HTM in a solution of a polymeric material in solvent to make an HTM solution. The dissolving further comprises: dissolving such that the HIM solution comprises a solid weight ratio of HTM to polymer is in the range of from about 0.5:10 to about 1:1. For example the HTM solution can be dissolved such that the HTM solution comprises solid weight ratio of HTM to polymer in the range of from about 9:10 to about 1:1, and The ETM solution comprising a solid weight ratio of ETM to polymer being from about 0.1:10 to about 1:1 can be added. In an embodiment the ETM solution can be dissolved such that the ETM solution comprises the solid weight ratio of ETM to polymer being from about 0.5:10 to about 2:10.

In an embodiment the method further comprises: combining the HTM solution and the ETM solution to form a CTM material comprising a weight ratio of ETM:HTM:Polymer in the range of 5:45:50 to about 10:40:50.

In embodiments the method further comprises forming the photoconductor by precoating the conductive substrate with a UCL prior to the forming the photoconductor layer, wherein the UCL comprises a material for eliminating charge injection from the conductive substrate. The method can further comprising forming the UCL using a UCL, examples of which include: anodized aluminum, titanium dioxide, and 2-aminopropyltriethoxysilane.

The method can further comprising forming the UCL at a thickness in the range of from about 50 nanometers to about 500 nanometers.

DETAILED DESCRIPTION OF THE INVENTION

Figure 1A:
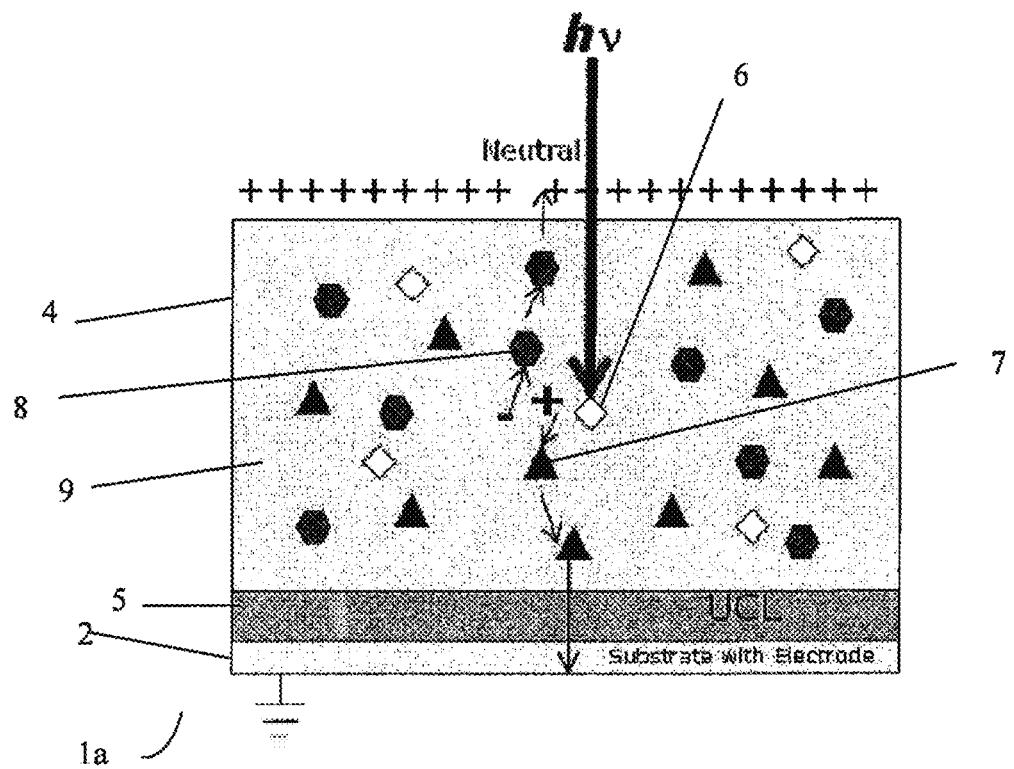
FIGS. 1A and 1B depict schematics of embodiments of a QDPC device.

It is to be understood that the figures and descriptions of the present invention have been simplified to illustrate elements that are relevant for a clear understanding of the present invention, while eliminating, for purposes of clarity, many other elements which are conventional in this art. QDs have been explored for their electroluminescent properties with applications in optoelectronics, particularly, as active emitting layers in planar light emitting devices. Quantum dots have also been studied for use in photovoltaics, specifically as the active layer in solar cells. Examples of such quantum dot optoelectronic devices, applications, methods and elements thereof are described in U.S. Pat. Nos. 5,889,288; 5,923,046; 5,963,571; 6,281,519; 6,239,449; 7,282,732; 7,358,525; 7,791,157; 7,829,880; 8,164,083, and U.S. patent application Ser. No. 13/190,884 the entirety of each of which are incorporated by reference herein.

Quantum dots also exhibit desired characteristics for use as CGM in photoconductors. Typical colloidal quantum dot compositions including the type used in embodiments described herein, consist of an active inorganic core, for example InP or Si shrouded by an organic ligand capping layer, for example trioctylphosphine oxide (TOPO), or an active inorganic core encased by an inorganic shell, for example ZnS which is also shrouded by an organic ligand capping layer (core-shell structure). In general, core-shell structures possess increased stability and lower charge recombination rates due to elimination of the core surface defects by the shell moiety. The organic capping layer assists in enhancing the dispersability of the QD composition in various solvents and also acts as a stabilizing agent. As such, it is an integral part of the colloidal system during initial processing; however, it may be modified or removed afterward.

Conventional photoconductors utilize dyes such as diazo or phthalocyanine compounds and derivatives as CGM. These compounds are readily available and have been produced and used as CGMs in electrophotographic printer's photoconductors extensively. Due to higher optical absorption cross section, QDs are expected to absorb more photons under equal illumination compared with conventional CGMs. This in turn will result in more efficient exciton generation in QDs. As a result, the optical power output of the exposure source need not be increased to increase the photoresponse. Spectral tunability in quantum dots affords exact matching of the optical absorption profile/peak to the wavelength of the incoming light, without changing the composition of the CGM material. In addition, generation of free charge carriers and charge transfer to transport molecules is expected to be more efficient due to the direct relationship between size and the position of the QD energy levels. The ability to control the QD surface will afford a path to enhancing charge generation and transfer as well. The above-mentioned enhancements should result in an overall improvement in photoconductor sensitivity, which in turn would translate to a higher printing speed. Also, due to their inorganic nature, semiconductor quantum dot CGMs are expected to be more photostable compared with their organic CGM counterparts.

Those of ordinary skill in the art will recognize that other elements are desirable for implementing the present invention. However, because such elements are well known in the art, and because they do not facilitate a better understanding of the present invention, a discussion of such elements is not provided herein.

The use of the terms "a", "an", "at least one", "one or more", and similar terms indicate one of a feature or element as well as more than one of a feature. The use of the term "the" to refer to the feature does not imply only one of the feature and element.

When an ordinal number (such as "first", "second", "third", and so on) is used as an adjective before a term, that ordinal number is used (unless expressly or clearly specified otherwise) merely to indicate a particular feature, such as to distinguish that particular feature from another feature that is described by the same term or by a similar term.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate). Similarly, where more than one device, article or other product is described herein (whether or not they cooperate), a single device/article may alternatively be used in place of the more than one device or article that is described. Accordingly, the various functionality that is described as being possessed by more than one device or article may alternatively be possessed by a single device/article.

The functionality and/or the features of a single device that is described may be alternatively embodied by one or more other devices, which are described but are not explicitly described as having such functionality/features. Thus, other embodiments need not include the described device itself, but rather can include the one or more other devices, which would in those other embodiments, have such functionality/features.

The present invention will now be described in detail on the basis of exemplary embodiments.

Examples of the QDs include, but are not limited to: CdS, CdSe, ZnS, ZnSe, GaN, GaP, InP, InN, PbSe, PbS, Ge, CuI, Copper Indium Disulfide (CIS), Si, and ZnS:Mn. The quantum dots may be of core or core/shell structure, and include a layer of organic ligands on the surface to facilitate solution processing and dispersion stability. The photoconductor can also comprise materials selected from the group of materials including:

1. Hole Transport Material (HTM), examples of which include but are not limited to: N,N'-Bis(3-methylphenyl)-N, N'-diphenylbenzidine, N,N'-Di-[(1-naphthyl)-N,N'-diphenyl]-1,1'-biphenyl)-4,4'-diamine, Tetra-N-phenylbenzidine, Tris[4-(diethylamino)phenyl]amine, N,N-diethylaminophenylbenzaldehyde-diphenylhydrazone, and other substituted Hydrazones.

2. Electron Transport Material (ETM), examples of which include but are not limited to: Bathocuproine, Bathophenanthroline, 2,5-Bis(1-naphthyl)-1,3,4-oxadiazole, 3,5-Bis(4-tert-butylphenyl)-4-phenyl-4H-1,2,4-triazole, and Tris-(8-hydroxyquinoline)aluminum.

3. Polymeric Material, including a Polymer Matrix (PM) and/or Resins, examples of which include but are not limited to: Bisphenol-A-polycarbonate, Poly(methyl methacrylate), Polystyrene, Polyvinyl butyral, Polyester, and Polycarbonate-Z.

In embodiments disclosed herein, a photoconductor includes semiconductor quantum dots as its CGM.

FIG. 1A depicts a schematic of an exemplary embodiment of a QDPC device 1a. In this embodiment, the QDPC 1a comprises a substrate comprising at least one electrical conducting layer 2, and an active region comprising at least one photoconductor layer 4 comprising quantum dots 6. Also shown is an optional undercoat layer 5.

The architecture includes an active region that may comprise at least one photoconductor layer that comprises CGM including quantum dots 6 within the device. The photoconductor's active region may also comprise a CTM 7, 8 within the device, for example, embedded within the active layer(s) 4. Illumination of the device 1 with light having a specific wavelength range results in generation of electron-hole pairs (excitons) within the active layer 4. Once generated, the excitons may diffuse through the active layer 4 and arrive at an interface (not shown) where the electrons and the holes can be separated.

Figure 1B:
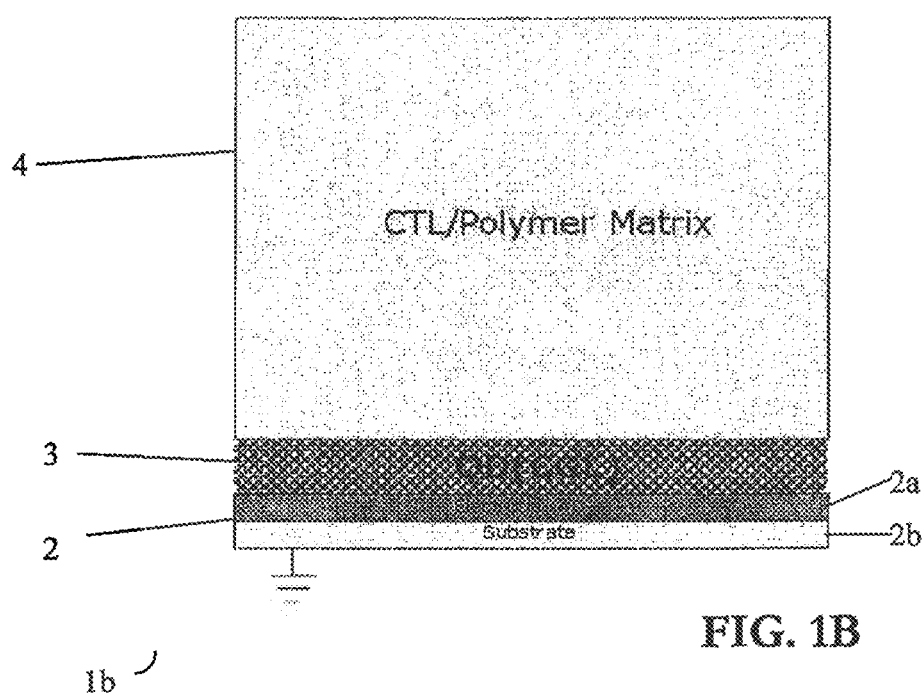

FIG. 1B depicts a general schematic of an exemplary dual-layer QDPC device 1b. In this embodiment, the QDPC 1b includes, the substrate comprising at least one electrical conducting layer 2, and an active region comprising a plurality of photoconductor layers 3, 4 including a charge generation layer (CGL) 3 comprising quantum dots and a charge transfer layer (CTL) 4 including charge transfer materials. The electrical conducting layer 2 can comprise a substrate made of a conductive material, or as shown in the embodiment, the electrical conducting layer 2 can comprise a substrate 2b that may not itself be conductive (e.g., glass or Mylar or PET) but is coated with conductive material 2a such as aluminum or nickel to render it conductive. The conductive substrate can be formed by techniques known in the art, for example, e-beam or thermal evaporation.

Fabrication of the Standard Device

For fabrication of the device, a base substrate including at least one conductive layer 2 is provided or formed. As described above, the conductive layer can comprise a conductive substrate as known in the art, including conductive substrates selected from the group of: aluminum plates and cylinders, and substrates, including non-conductive substrates such as glass, Mylar, or PET, coated with conductive materials such as nickel or aluminum.

For example, a conductive layer 2 as illustrated in FIG. 1B is formed as follows. A substrate 2b is placed in an e-beam evaporator where a 100 to 200 nm thick layer of conductive material, for example aluminum (Al), material is deposited on substrate 2b (e.g., glass, Mylar, or PET) at a rate of 0.2 nm/s and an operating vacuum level of 1.0E-6 Torr. Following the electrode deposition, the resulting conductive substrate is removed from the evaporator, whereupon the subsequent layers, including the active region are formed.

Next, an active region of the at least one photoconductor layer is formed. As described herein, the active region can comprise an active region comprising a single layer or a plurality of layers.

Single-Layer

Example 1

In an embodiment, as shown in FIG. 1A, a QDPC comprises a "Single-Layer" architecture, which incorporates all PC components in a single active layer, and may include conventional charge transport materials (CTM) for both electron and hole transport within a polymer matrix host 9. To form the QDPC 1a, an HTM 7 is first dissolved in a solution of a polymeric material 9. The polymeric material 9 comprises a polymeric matrix (PM) and/or resin binder in solvent. Examples of solvents include, but are not limited to, 2-butanone, cyclohexanone, 1,4-dioxane, chloroform, tetrahydrofuran (THF), benzene, and methylene chloride. The solid weight ratio of HTM 7 to polymer 9 is in the range of from about 0.5:10 to about 1:1, for instance, about 9:10 to about 1:1.

An ETM 8 is also dissolved in a solution of polymeric material 9 in solvent, with a solid weight ratio of ETM 8 to polymer 9 of 0.1:10 to 1:1, preferably 0.5:10 to 2:10. Next the HTM solution and ETM solution (HTM in polymer and ETM in polymer) are combined to form the CTM component of the photoconductor formulation, with a weight ratio of ETM: HTM:Polymer in the range of 5:45:50 to 10:40:50.

Following the aforesaid preparation of the CTM, a colloidal solution of quantum dots 6 is added to the CTM with a solid weight ratio of 0.1:10 to 5:10.

To evaporate the solvent, the substrate including the additional layer(s) can be placed in a vacuum oven and heated in the range of 25 degrees C. to 100 degrees C., preferably, 30 degrees C. to 70 degrees C., at 1.0E-3 torr for 1-24 hours.

In the embodiment, fabrication of the QDPD device 1a wherein the active region comprises a single photoconductor layer includes the following steps prior to deposition on the conductive substrate 2 using the finalized CTM solution including the quantum dots 6. In the embodiment, the photoconductor may be coated as a single layer on a conductive substrate 2 (electrode). The photoconductor layer 4 thickness is in the range of from about 1 micrometer to about 40 micrometers, for example, from about 20 micrometers to about 37 micrometers.

The conductive substrate 2 may also be pre-coated with an under coat layer (UCL) 5 prior to deposition of the photoconductor layer 4 to eliminate possible charge injection from the electrode, which may degrade device performance. Examples of an UCL 5 include, but are not limited to, anodized aluminum, titanium dioxide, and 2-aminopropyltriethoxysilane. Typical UCL 5 thickness is in the range of 50-500 nm.

Example 2

In another embodiment, the formulation of the photoconductor layer 4 may comprise QDs 6 (CGM), HTM 7, and the polymer matrix 9. In the embodiment, a QDPC is prepared in the same manner as in Example 1 above, except for the absence of the ETM and modification of solid weight ratio of the quantum dots to CTM in a range of 1:10 to 5:10. Accordingly, HTM 7 is first dissolved in a solution of a polymeric material 9 as described in Example 1. The solid weight ratio of HTM 7 to polymer 9 is in the range of from about 0.5:10 to about 1:1, for instance, about 9:10 to about 1:1. This affords the CTM component of the photoconductor formulation. Following the aforesaid preparation of the CTM, a colloidal solution of quantum dots 6 is added to the CTM with a solid weight ratio of 1:10 to 5:10, which finalizes the formulation for the photoconductor.

Example 2a

In another embodiment, the formulation of the photoconductor layer 4 may comprise QDs 6 (CGM), ETM 8, and the polymer matrix 9. In the embodiment, a QDPC is prepared in the same manner as in Example 1 above, except for the absence of the HTM and modification of solid weight ratio of the quantum dots to CTM in a range of 1:10 to 5:10. Accordingly, ETM 8 is first dissolved in a solution of a polymeric material 9 as described in Example 1. The solid weight ratio of ETM 8 to polymer 9 is in the range of from about 0.1:10 to about 1:1, for instance, about 0.5:10 to about 2:10. This affords the CTM component of the photoconductor formulation. Following the aforesaid preparation of the CTM, a colloidal solution of quantum dots 6 is added to the CTM with a solid weight ratio of 1:10 to 5:10, which finalizes the formulation for the photoconductor.

Example 3

In another embodiment, the formulation of the photoconductor layer 4 may contain QDs 6 (CGM) and the polymer matrix 9. A preparation follows the aforementioned methodology of Examples 1 and 2, except for the absence of the HTM and the ETM and modification in percent solid weight of the quantum dots 6 to a range of 2-40%. Accordingly, a colloidal solution of QDs 6 are dissolved in a solution of a polymeric material 9 selected from, for example, the polymer materials described herein. The solid weight ratio of QDs is the range of from about 2% to about 40%.

Example 4

In another embodiment, the formulation of the photoconductor layer 4 may contain QDs 6 (CGM) only. A preparation follows the aforementioned methodology of Examples 1-3, except for the absence of: the HTM, the ETM, and the polymer matrix. Accordingly, a colloidal solution of QDs 6 is deposited on the electrode 2, the solution being from about 1% to about 20% QD 6. The resulting QD layer 4 thickness is in the range of from about 1 micrometer to about 3 micrometers.

Dual Layer

As noted above, the active region of the QDPC can further comprise an active region comprising at least two layers. In embodiments, the photoconductor 1b can comprise a Charge Generation Layer (CGL) 3 comprising the QDs, and a Charge Transport Layer (CTL) 4 comprising the CTM, as shown in FIG. 1B.

Example 5

In another embodiment as shown in FIG. 1B, the active segment of the photoconductor for the dual layer architecture includes two separate, discreet layers: a CGL 3 and a CTL 4. (As will be noted, certain elements from FIG. 1A are not illustrated in FIG. 1B for purposes of simplification). A CGM comprising QDs is mixed with a polymer material, for example, as selected from the polymer materials described herein. The QD to polymer solid weight ratio is in the range of from about 0.01:10 to about 5:10. Next, the CGM mixture is dissolved in a solvent, for example, a solvent selected from the solvents described herein to afford a CGM solution. The solution is then deposited on a conductive surface 2, as can be selected from conductive materials as described herein. The conductive surface 2 may optionally include a UCL coating (not shown) prior to CGL 3 formation, for example via spin-coating, blade-coating, dipcoating, or ring-coating, as described herein. Typical thickness of the CGL 3 is in the range of from about 10 nm to about 2000 nm.

In the embodiment, a CTM solution for the dual layer architecture is prepared, where the CTM comprises the HTM, but not the ETM. Accordingly, the HTM is dissolved in a solution of a polymeric material as described above. The solid weight ratio of HTM to polymer is in the range of from about 0.5:10 to about 1:1, for instance, about 9:10 to about 1:1. This affords the CTM component of the photoconductor formulation.

The CTM is deposited on the CGL 3 to form the charge transport layer 4. The CTL comprises a thickness in the range of from about 1 micrometer to about 40 micrometers. In an embodiment the CTL 4 thickness is from about 5 micrometers to about 35 micrometers. The CTL 4 may also be processed through vacuum heating using techniques known in the art to remove any residual solvent molecules from the layer. Hence, the dual layer photoconductor 1b is formed.

Example 6

In another embodiment, the dual-layer QDPC is formed in the same manner as that of Example 5, except the charge generation layer may consist essentially of quantum dots, and does not include the polymer matrix. In this case, the CGL 3 is formed from a solution of QDs with solid content in the range of 1 to 10%.

Although exemplary embodiments of the present invention and modifications thereof have been described in detail herein, it is to be understood that this invention is not limited to these precise embodiments and modifications, and that other modifications and variations may be effected by one skilled in the art without departing from the spirit and scope of the invention as defined by the appended claims.

What is claimed is:

1. A photoconductor comprising:
   at least one conductive layer and;
   an active region comprising at least one photoconductor layer comprising:
   a Charge Generation Layer (CGL) consisting essentially of a plurality of quantum dots (QDs).

2. The photoconductor of claim 1, further comprising:
   an active region consisting essentially of a single layer.

3. The photoconductor of claim 2, further comprising:
   the single layer thickness in the range of from about 1 micrometer to about 40 micrometers.

4. The photoconductor of claim 1, further comprising:
   an active region comprising at least two layers.

5. The photoconductor of claim 4, further comprising:
   the CGL consisting essentially of the QDs, and
   a Charge Transport Layer (CTL) comprising a Charge Transport Material (CTM).

6. The photoconductor of claim 5, the CTL further comprising:
   a polymeric material comprising a polymer matrix or resin or both, wherein the at least one photoconductor layer is formed with at least one solution of the polymeric material including the CTM.

7. The photoconductor of claim 5, comprising: the thickness of the CGL being in the range of about 10 nm to about 2000 nm and the thickness of the CTL being in the range of about 1 micrometer to about 40 micrometers.

8. The photoconductor of claim 7, comprising: the thickness of the CTL being in the range of about 5 micrometers to about 35 micrometers.

9. The photoconductor of claim 1, further comprising:
   an undercoat layer (UCL), the UCL being precoated on the conductive layer prior to deposition of the at least one photoconductor layer, wherein the UCL comprises a material for eliminating charge injection from a conductive substrate forming the conductive layer.

10. Thew photoconductor or claim 9, further comprising:
    the UCL comprising a UCL selected from the group of anodized aluminum, titanium dioxide, and 2-aminopropyltriethoxysilane.

11. The photoconductor of claim 10, further comprising:
    the UCL thickness in the range of from about 50 nanometers to about 500 nanometers.

12. The photoconductor of claim 1, the device further comprising:
    the quantum dots including quantum dots selected from the group of:
    size-dependent quantum dots, composition-dependent quantum dots, core-shell quantum dots, alloyed core quantum dots, alloyed core-shell quantum dots, doped quantum dots, InP/ZnS core-shell quantum dots, CdS, CdSe, ZnS, ZnSe, GaN, GaP, InP, InN, PbSe, PbS, Ge, CuI, Copper Indium Disulfide (CIS), Si, CdSSe, and ZnS:Mn doped quantum dots.

13. The photoconductor of claim 1 comprising:
    the conductive layer comprising a conductive substrate sdected from the group of: aluminmum plates and cylinders, a non-conductive substrate coated with a conductive material, aluminum-coated Mylar or PET, and nickel-coated Mylar or PET.

14. The photoconductor of claim 1, wherein the CGL is formed from a CGM solution comprising from about 1 percent to about twenty percent QDs.

15. The photoconductor of claim 14, wherein the thickness of the CGL if in the range from about 1 micrometer to about 3 micrometers.

16. A photoconductor comprising:
    at least one conductive layer and;
    an active region comprising at least one photoconductor layer comprising:
    a charge generation material (CGM) comprising a plurality of quantum dots; and
    a polymeric material comprising a polymer matrix or resin or both, wherein the at least one photoconductor layer is formed with at least one solution of the polymeric material including at least one of the CGM and a Charge Transport Material (CTM),
    and the solid weight ratio of the quantum dots to the CTM is in the range of from about 1:10 to about 5:10.

17. The photoconductor of claim 16, further comprising:
    a Hole Transport Material (HTM); and
    wherein the at least one photoconductor layer is formed by dissolving the HTM in a solution of a polymeric material in solvent to make an HTM solution.

18. The photoconductor of claim 17 further comprising:
    the HTM comprising an HTM selected from the group of; N,N'-Bis(3-methylphenyl)-N,N'-diphenylbenzidine, N,N'-Di-[(1-naphthyl)-N,N'diphenyl]-1,1'-biphenyl)-4, 4'-diamine, Tetra-N-phenylbenzidine. Tris[4-(diethylamino)phenyl]amine, N,N'-diethylaminophenylbenzaldehyde—diphenylhydrazone, and substituted Hydrazones.

19. The photoconductor of claim 16, further comprising:
    an Electron Transport Material (ETM),
    wherein the at least one photoconductor layer is formed by dissolving the ETM in a solution of a polymeric material in solvent to make an ETM solution.

20. The photoconductor of claim 19, further comprising:
    the ETM solution comprising a solid weight ratio of ETM to polymeric material in the range from about 0.1:10 to about 1:1.

21. The photoconductor of claim 20, further comprising:
    the ETM solution comprising the solid weight ratio of ETM to polymeric material in the range from about 0.5:10 to about 2:10.

22. The photoconductor of claim 19, further comprising:
    the ETM comprising an ETM selected from the group of: Bathocuproine, Bathophenanthroline, 2,5Bis(1-naphthyl)-1,3,4-oxadiazole, 3,5-Bis(4-tert-butylphenyl)-4-phenyl-4H-1,2,4-triazole, and Tris-(8-hydroxyquinoline)aluminum.

23. The photoconductor of claim 19, further comprising:
    a Hole Transport Material (HTM),
    wherein the photoconductor is formed by
       dissolving the HTM in a solution of a polymeric material in solvent to make an HTM solution;
       combining the HTM solution and the ETM solution to form a CTM preparation, and
       adding the solution comprising quantum dots to the CTM preparation.

24. The photoconductor of claim 23, further comprising: the HTM solution comprising a solid weight ratio of HTM to polymeric material in the range from about 0.5:10 to about 1:1.

25. The photoconductor of claim 16, further comprising: the polymeric material selected from the group of: Bisphenol-A-polycarbonate, Poly(methyl methacrylate), Polystyrene, Polyvinyl butyral, Polyester, and Polycarbonate-Z.

26. The photoconductor of claim 16, further comprising: a solid weight ratio of the quantum dots to the polymeric material being from about 2 percent to about 40 percent.

27. A photoconductor comprising:
at least one conductive layer and;
an active region comprising at least two photoconductor layers comprising a Charge Generation Layer (CGL) and a Charge Transport Layer (CTL):
a charge generation material (CGM) comprising a plurality of quantum dots; and
polymeric material comprising a polymer matrix or resin or both, wherein the CGL formed with at least one solution of the polymeric material including the CGM, the CGM solution comprising a solid weight ratio of the quantum dots to the polymeric material in the range of from about 0.01:10 to about 5:10;
wherein the CGL is formed from the CGM solution.

28. A method of forming a photoconductor comprising: forming a charge generation material (CGM) consisting essentially of a plurality of quantum dots (QDs), and forming an active region comprising at least one photoconductor layer comprising the CGM to form a charge generation layer (CGL) consisting essentially of the plurality of quantum dots on a conductive substrate including at least one electrically conductive layer.

29. The method of claim 28, wherein the method further comprises: forming the CGL from a CGM solution comprising from about 1% to about 20% of the QDs.

30. The method of claim 29, wherein the method further comprises: depositing the CGL at a thickness in the range of from about 1 micrometer to about 3 micrometers.

31. The method of claim 28, wherein the method further comprises: forming an active region comprising at least two photoconductor layers.

32. The method of claim 31, further comprising: wherein the at least two photoconductor layers include the charge generation layer (CGL) consisting essentially of the QDs, and a charge transport layer (CTL) comprising a charge transport material (CTM).

33. The method of claim 32, the method further comprising: forming the CGL from a CGM solution comprising a solid weight ratio of the quantom dots to the CTM being from about 1 percent to about 10 percent.

34. The method of claim 32, wherein the method further comprises: forming the CTL with a solution of polymeric material comprising a polymer matrix or resin or both, the polymeric material including the CTM.

35. The method of claim 34, wherein the method further comprises: forming the CTM by dissolving a hole transport material (HTM) in the solution of the polymeric material to make a HTM solution.

36. The method of claim 35, wherein the dissolving further comprises: using a solvent selected from the group of: 2-butanone, cyclohexanone, 1,4-dioxane, chloroform, tetrahydrofuran (THF), benzene and methylene chloride.

37. The method of claim 35, dissolving such that the HTM solution comprises a solid weight ratio of HTM to polymeric material in the range from about 0.5:10 to about 1:1.

38. The method of claim 28, further comprising: precoating the conductive substrate with an under coat layer (UCL) prior to forming the at least one photoconductor layer, wherein the UCL comprises a material for eliminating charge injection from the conductive substrate.

39. The method of claim 38, further comprising:
forming the UCL with the UCL comprising a UCL selected from the group of anodized aluminum, titanium dioxide, and 2-aminopropyltriethoxysilane.

40. The method of claim 38 further comprising:
forming the UCL at a thickness in the range of from about 50 nanometers to about 500 nanometers.

41. The method of claim 28, wherein the method comprises:
forming the CGM with quantum dots including quantum dots selected from the group of:
size-dependent quantum dots, composition-dependent quantum dots, core-shell quantum dots, alloyed core quantum dots, alloyed core-shell quantum dots, InP/ZnS core-shell quantum dots, doped quantum dots, CdS, CdSe, ZnS, ZnSe, GaN, GaP, InP, InN, PbSe, PbS, Ge, CuI, Copper Indium Disulfide (CIS), Si, CdSSe, and ZnS:Mn doped quantum dots.

42. The method of claim 28, further comprising: wherein the conductive substrate is selected from the group of: aluminum plates and cylinders, a non-conductive substrate coated with a conductive material, aluminum-coated Mylar or PET, and nickel-coated Mylar or PET.

* * * * *